United States Patent
Jaiswal

(10) Patent No.: US 7,684,556 B1
(45) Date of Patent: Mar. 23, 2010

(54) CONVERSATIONAL BIOMETRIC COUPLED WITH SPEECH RECOGNITION IN PASSIVE MODE DURING CALL HOLD TO AFFECT CALL ROUTING

(75) Inventor: Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/505,115

(22) Filed: Jul. 17, 2009

(51) Int. Cl.
*H04M 3/00* (2006.01)
(52) U.S. Cl. .................. 379/266.01; 379/88.01; 704/200.01
(58) Field of Classification Search ............ 370/88.01, 370/266.01; 704/200.01; 379/265.07, 265.02
See application file for complete search history.

(56) References Cited

U.S. PATENT DOCUMENTS

| | | | |
|---|---|---|---|
| 5,978,467 A * | 11/1999 | Walker et al. ......... | 379/266.01 |
| 6,002,760 A | 12/1999 | Gisby | |
| 6,606,596 B1 | 8/2003 | Zirngibl et al. | |
| 6,611,590 B1 | 8/2003 | Lu et al. | |
| 6,724,887 B1 * | 4/2004 | Eilbacher et al. ....... | 379/265.03 |
| 6,799,163 B2 | 9/2004 | Nolan | |
| 6,879,685 B1 | 4/2005 | Peterson et al. | |
| 6,885,734 B1 | 4/2005 | Eberle et al. | |
| 7,013,005 B2 | 3/2006 | Yacoub et al. | |
| 7,054,811 B2 | 5/2006 | Barzilay | |
| 7,127,400 B2 | 10/2006 | Koch | |
| 7,197,461 B1 | 3/2007 | Eberle et al. | |
| 7,215,759 B2 | 5/2007 | Brown et al. | |
| 7,242,752 B2 | 7/2007 | Chiu | |
| 7,318,032 B1 | 1/2008 | Chaudhari et al. | |
| 7,336,779 B2 * | 2/2008 | Boyer et al. ........... | 379/265.02 |
| 7,397,905 B1 | 7/2008 | Stewart et al. | |
| 7,502,742 B2 | 3/2009 | Knott et al. | |
| 2003/0110039 A1 | 6/2003 | Brown et al. | |
| 2004/0174980 A1 * | 9/2004 | Knott et al. ............ | 379/266.01 |
| 2005/0069102 A1 | 3/2005 | Chang | |
| 2006/0245579 A1 | 11/2006 | Bienfait et al. | |
| 2007/0041527 A1 | 2/2007 | Tuchman et al. | |

(Continued)

FOREIGN PATENT DOCUMENTS

WO    WO2005112416    11/2005

OTHER PUBLICATIONS

Maes, S., "Conversational Biometrics", 6th European Conference on Speech Communication and Technology (Eurospeech), Budapest, Hungary.

(Continued)

*Primary Examiner*—Olisa Anwah
(74) *Attorney, Agent, or Firm*—Leveque IP Law, P.C.

(57) ABSTRACT

Conversational biometrics and speech recognition are used by an IVR contact/call center during call hold to affect call handling/routing. A caller's (user's) behavioral response, such as an utterance or other spoken reaction to being put on hold by the IVR contact/call center, etc., can be recognized, captured and analyzed. Business rules analyze the caller's behavior in real time during a caller hold period. Such business rules can be fed back into the call center system and this information can be used to provide opportunities to affect routing priorities for a particular caller based upon information learned by the data that is captured and analyzed.

1 Claim, 2 Drawing Sheets

U.S. PATENT DOCUMENTS

| | | |
|---|---|---|
| 2007/0055517 A1 | 3/2007 | Spector |
| 2008/0015859 A1 | 1/2008 | Novack et al. |
| 2008/0015865 A1 | 1/2008 | Chiu |
| 2008/0080506 A1 | 4/2008 | Kelly et al. |
| 2008/0256613 A1 | 10/2008 | Grover |
| 2009/0046841 A1 | 2/2009 | Hodge |
| 2009/0161859 A1 | 6/2009 | Erhart et al. |

OTHER PUBLICATIONS

Thies, D., "Die Call Center Diel Why your call center sucks", http://www.seofaststart.com/blog/die-call-center-die-why-your-call-center-sucks, Aug. 9, 2008.

Anonymous, "Speech recognition assisted call center and self service interface", IPC0M000182420D, http://www.ip.com/pubview/IPCOM000182420D, Apr. 30, 2009.

* cited by examiner

CONVERSATIONAL BIOMETRIC COUPLED WITH SPEECH RECOGNITION IN PASSIVE MODE DURING CALL HOLD TO AFFECT CALL ROUTING

BACKGROUND

Modern day contact (call) centers generally provide call prompting to inbound calls, in which the caller is guided through a set of menu choices. These choices may provide some level of service to the inbound call/caller, or allow the call to be routed to an agent of the call center who possesses suitable skills for handing the inbound call.

It is noted during peak call times and volumes, however, that callers typically have to wait in a queue, during which Interactive Voice Response (IVR) technology employed by the call center plays hold music or provides some kind of announcement for receipt by the caller during this time. User behavior or reactions during the caller hold/wait time, during which music or announcements are played for the caller, is not captured. At the end of the wait period, the caller is usually then routed to an agent.

BRIEF SUMMARY

In accordance with embodiments consistent with the present invention, a method of passively using conversational biometrics coupled with speech recognition during a call hold time is provided. A call is received from a caller at an interactive voice response (IVR) contact center. The IVR contact center determines whether a hold time of the call is required; if the IVR contact center determines that the hold time of the call is required, the IVR contact center during a caller hold period further: prompts the caller with a please hold dialogue; activates a speech recognition and conversational biometrics engine, wherein the conversational biometrics engine comprises a rules engine; the speech recognition and conversational biometrics engine passively monitors the call during the caller hold period to detect the occurrence of the caller uttering a reactive audio response for a predetermined period of time and collects the detected reactive audio response of the caller; and the rules engine of the conversational biometrics engine determines computer telephony integration routing logic using the collected detected reactive audio response. After the caller hold period, the IVR call center routes the call and the collected detected reactive audio response to an agent in accordance with the determined computer telephony integration routing logic.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Consistent with various embodiments presented herein, a caller's (user's) behavioral response, such as an utterance or other spoken reaction to being put on hold, etc., can be recognized, captured and analyzed. Business rules analyze the caller's behavior in real time during a caller hold period. Such business rules can be fed back into the call center system and this information can be used to provide opportunities to market to the caller and to effect routing priorities for a particular caller based upon information learned by the data that is captured and analyzed.

As an example, consider that a user may be able to pick hold music during the hold duration of the caller hold period. This selection can be used to gain further insight into the caller's preferences and/or behavior. The biometrics engine that is monitoring the call to capture behavioral input response from the caller provides this information to a rules engine which uses this information to effect routing decisions and business decisions for that particular caller. The caller's reactive audio response can be analyzed by a conversational biometrics engine which is capable of mining the speech and/or aural properties of the speech in real time to yield information about the caller.

Figure 1:
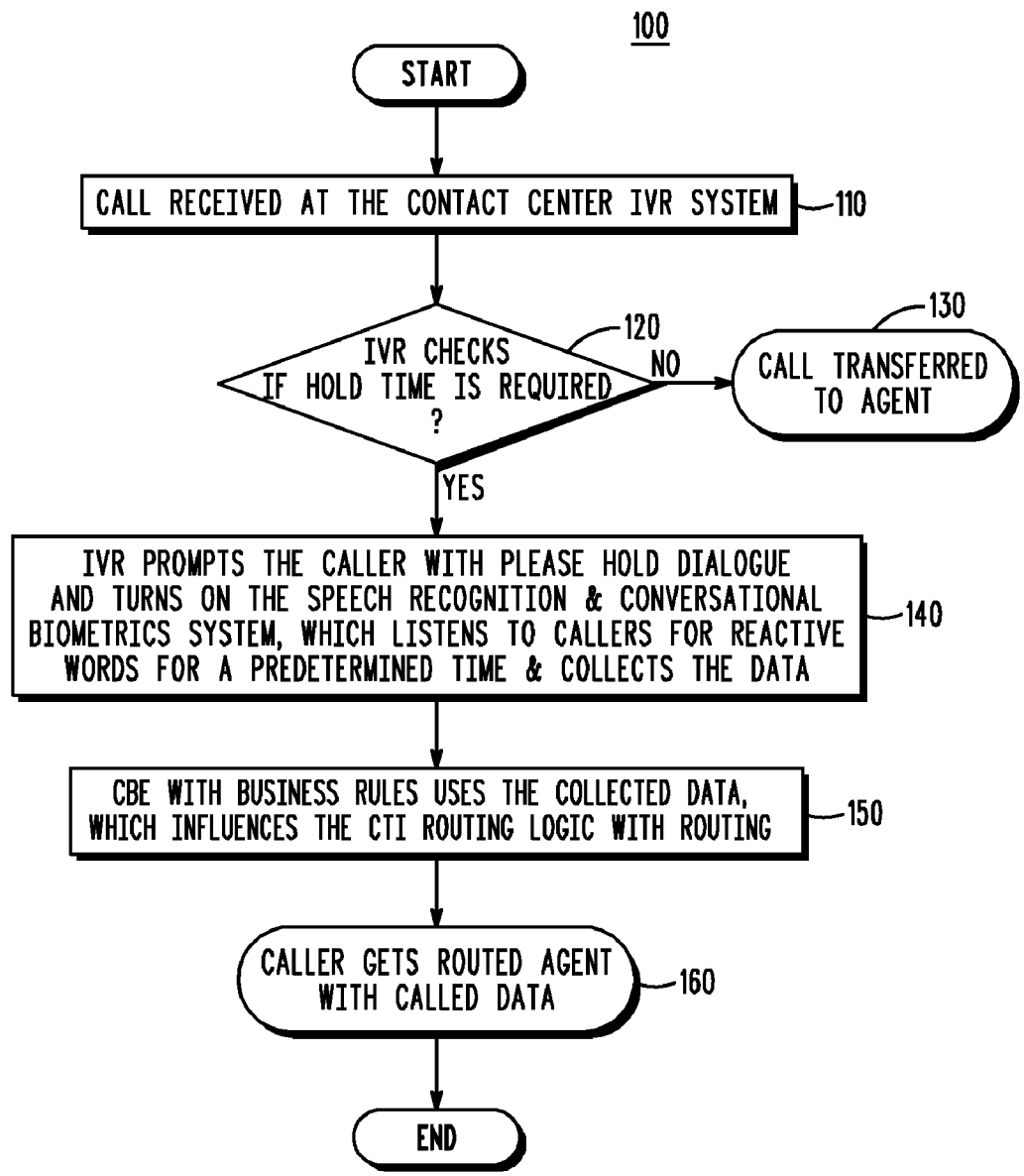
FIG. 1 is a flow chart that illustrates using conversational biometrics coupled with speech recognition during call hold to affect call handing, in accordance with certain embodiments.

Referring now to FIG. 1, flow chart 100 illustrates using conversational biometrics coupled with speech recognition during call hold to affect call handing, in accordance with certain embodiments. At Block 110, a call made by a caller is received at an IVR call or contact center from the caller. At Block 120, the contact center checks to see if a hold time is required before the caller's call can be routed to an agent. If no, then the call is transferred to an agent at Block 130 with no wait/hold time. If, however, a hold time is required than the flow proceeds to Block 140, where the IVR prompts the caller with a please hold dialogue/message and turns on the speech recognition and conversational biometrics engine (CBE), which listens to for reactive words/utterances from the caller for a predetermined time and passively collects data. At Block 150, the CBE has a business rules engine that uses the data collected at Block 140 to influences the computer telephony integration (CTI) routing logic of the call. At Block 160, the caller gets routed to an agent in accordance with the CTI routing logic.

Figure 2:
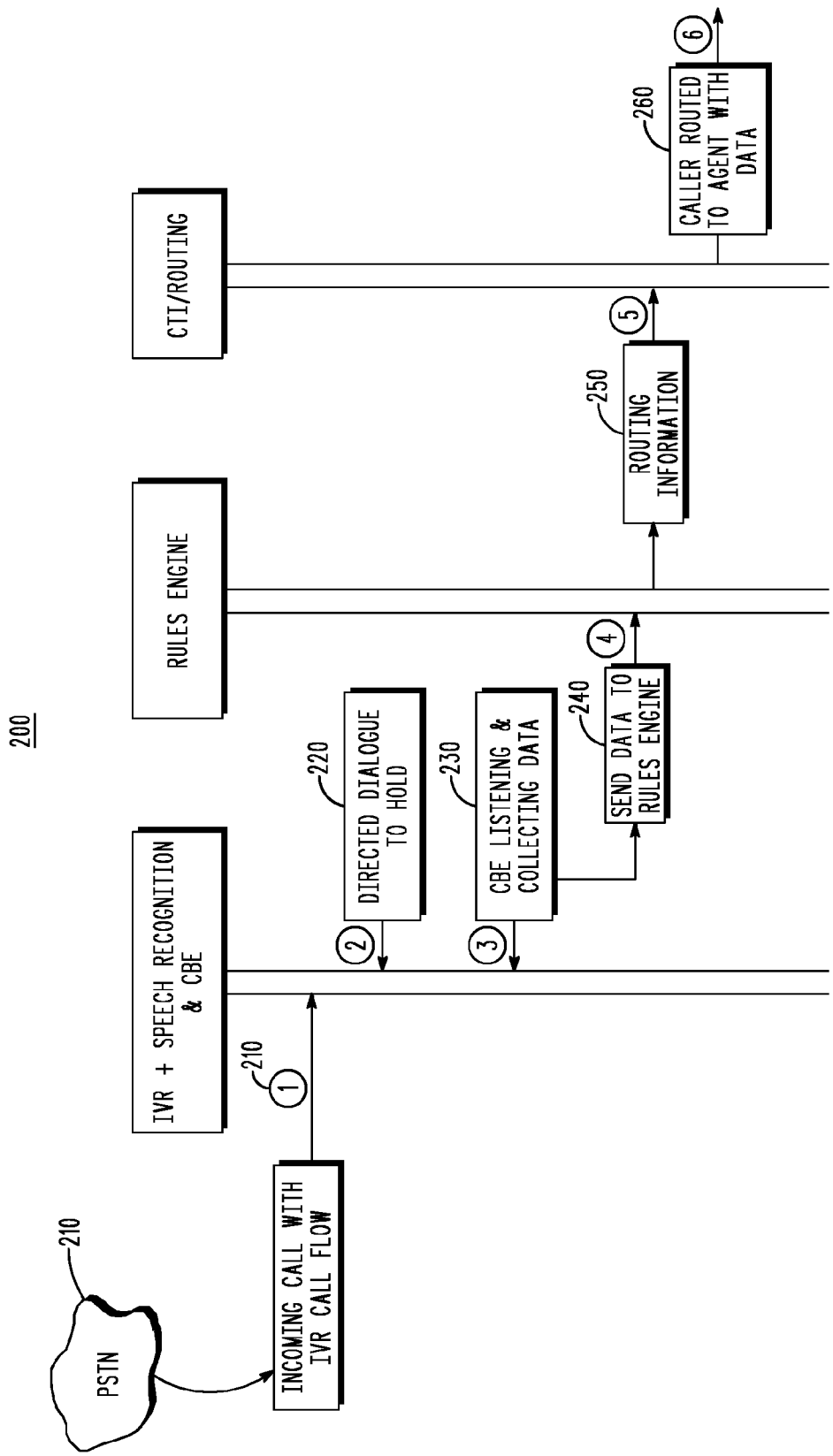
FIG. 2 is a sequence diagram that illustrates using conversational biometrics coupled with speech recognition during call hold to affect call handing, in accordance with certain embodiments.

Referring now to FIG. 2, a sequence diagram that uses conversational biometrics coupled with speech recognition during call hold to affect call handling/routing, in accordance with certain embodiments, is shown. At Time 1 210, caller places an incoming call via the PSTN to an IVR call center having IVR with speech recognition and a conversational biometrics engine (CBE). The IVR call center provides directed dialog to the caller to hold 220 at Time 2. During the hold time, the IVR is in a passive listening mode during which the CBE of the IVR passively listens and collects data of caller audio responses made during the call wait period 230 at Time 3. This collected data is sent to the rules engine of the IVR 240 at Time 4. The rules engine uses the collected data from the caller to determine a computer telephony integration (CTI) routing logic 250, which is sent to the CTI/Routing element of the IVR at Time 5. The caller is routed to an agent in accordance with this determined CTI routing logic 260 at Time 6.

Consider the following exemplary case:
Step 1: Caller calls into a toll free number for Company Orange, a company that sells MP3 players and music on the World Wide Web or Internet; the caller calls in for technical support of an MP3 player. The call is handled by an IVR contact center Step 2: Caller enters the device type or information for caller identification Step 3: Call system identifies caller, identifies device, and then notifies caller that he is the 5th call in the queue and that the anticipated wait time is 3 minutes Step 4: During the wait, music is played for the caller. Suppose the music is classical Mozart. A speech recognition and conversational biometrics engine recognizes that the user enjoys this music from utterances of the caller while on hold, such as, "I love Mozart." Conversely the speech recognition and conversational biometrics engine may capture behavioral audio input from the caller that indicates the music is not favored, such as, "I hate classical music." The conversational biometrics engine may pick up on the mood, feeling, stress level of the caller reflected in the audio input.

Step 5: While the IVR doesn't directly interact with the caller regarding his responses, this information is collected and can be used to effect routing of the call to an agent that receives this information. For example, if the collected audio response of the user is positive, "I love Mozart", this indicates that the user can tolerate the wait and routing may not happen as quickly as for someone who utters, "I hate classical music," for whom routing of his call may proceed more quickly. Moreover, this reactive response of the user is passed along to the agent, who may offer the user the opportunity to purchase classical music at a discount since such a caller happy with the hold music is more likely to be receptive to such marketing. Or, the biometric information gleaned from the caller utterance indicative of satisfaction, stress level, mood of the caller may be used to determine which agent to pass the caller to; for example, an agent with expertise at calming an angry customer may receive calls for which a caller expressed unhappiness during the call wait period.

Therefore, it can be seen that in accordance with embodiments consistent with the present invention, a method of passively using conversational biometrics coupled with speech recognition during a call hold time is provided. A call is received from a caller at an interactive voice response (IVR) contact center. The IVR contact center determines whether a hold time of the call is required; if the IVR contact center determines that the hold time of the call is required, the IVR contact center during a caller hold period further: prompts the caller with a please hold dialogue; activates a speech recognition and conversational biometrics engine, wherein the conversational biometrics engine comprises a rules engine; the speech recognition and conversational biometrics engine passively monitors the call during the caller hold period to detect the occurrence of the caller uttering a reactive audio response for a predetermined period of time and collects the detected reactive audio response of the caller; and the rules engine of the conversational biometrics engine determines computer telephony integration routing logic using the collected detected reactive audio response. After the caller hold period, the IVR call center routes the call and the collected detected reactive audio response to an agent in accordance with the determined computer telephony integration routing logic.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method of using conversational biometrics coupled with passive speech recognition and conversational biometrics during a call hold time, comprising:

receiving a call from a caller at an interactive voice response (IVR) contact center;

the IVR contact center determining whether a hold time of the call is required;

if the IVR contact center determines that the hold time of the call is required, the IVR contact center during a caller hold period further performs:

prompting the caller with a please hold dialogue;

activating a speech recognition and conversational biometrics engine, wherein the conversational biometrics engine comprises a rules engine;

the speech recognition and conversational biometrics engine passively monitoring the call during the caller hold period to detect the occurrence of the caller uttering a reactive audio response for a predetermined period of time and collecting the detected reactive audio response of the caller;

the rules engine of the conversational biometrics engine determining computer telephony integration routing logic using the collected detected reactive audio response;

after the caller hold period, routing the call and the collected detected reactive audio response to an agent in accordance with the determined computer telephony integration routing logic.

* * * * *